United States Patent
Fan et al.

(10) Patent No.: US 11,863,076 B2
(45) Date of Patent: Jan. 2, 2024

(54) CONTROL METHOD AND CONTROL DEVICE OF ISOLATED CONVERTER

(71) Applicant: Eaton Intelligent Power Limited, Dublin (IE)

(72) Inventors: Tai Fan, Shenzhen (CN); Kaijun Xie, Shenzhen (CN); Huaichao Zhang, Shenzhen (CN); Xiaoya Kuang, Shenzhen (CN); Yuan Cheng, Shenzhen (CN)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/574,125

(22) Filed: Jan. 12, 2022

(65) Prior Publication Data

US 2022/0224235 A1 Jul. 14, 2022

(30) Foreign Application Priority Data

Jan. 14, 2021 (CN) .......................... 202110047186.6

(51) Int. Cl.
*H02M 3/335* (2006.01)
*H02M 1/32* (2007.01)
(Continued)

(52) U.S. Cl.
CPC ..... *H02M 3/33569* (2013.01); *H02M 1/0064* (2021.05); *H02M 1/327* (2021.05); *H02M 3/156* (2013.01); *H02M 3/335* (2013.01)

(58) Field of Classification Search
CPC ............. H02M 3/335; H02M 3/33507; H02M 3/33569; H02M 3/33571; H02M 3/33573;
(Continued)

(56) References Cited

U.S. PATENT DOCUMENTS 5,657,215 A * 8/1997 Faulk ................ H02M 3/33507
363/41
6,127,816 A * 10/2000 Hirst ........................ G05F 1/44
323/283
(Continued)

FOREIGN PATENT DOCUMENTS

EP 0250464 1/1988
JP 2004215417 7/2004
(Continued)

OTHER PUBLICATIONS

Extended European Search Report for EP application No. 22151626.3, dated Jul. 6, 2022, 9 pages.
(Continued)

*Primary Examiner* — Thienvu V Tran
*Assistant Examiner* — Shahzeb K Ahmad
(74) *Attorney, Agent, or Firm* — Stanek Lemon Crouse & Meeks, P.A.

(57) ABSTRACT

The present invention provides a control device for an isolated converter, including a comparison module, which receives a load percentage of the isolated converter, compares the load percentage with a first preset threshold and a second preset threshold, and outputs a comparison result; and an adjustment module, which receives the comparison result and adjusts a switching frequency of a switching transistor of the isolated converter based on the comparison result, wherein when the load percentage is not greater than the first preset threshold value, the switching frequency is set to a first frequency value to prevent magnetic saturation of a transformer of the isolated converter, and when the load percentage is greater than the second preset threshold value and in a stable state, the switching frequency is set to a second frequency value, so that the temperature of the isolated converter does not exceed the maximum allowable temperature, wherein the first preset threshold is less than or equal to the second preset threshold, and the first frequency value is greater than the second frequency value.

14 Claims, 6 Drawing Sheets

(51) Int. Cl.
*H02M 1/00* (2006.01)
*H02M 3/156* (2006.01)

(58) Field of Classification Search
CPC .. H02M 3/33592; H02M 3/337; H02M 3/156; H02M 1/0048; H02M 1/0054; H02M 1/0064; H02M 1/327; H02M 1/32
See application file for complete search history.

(56) References Cited

U.S. PATENT DOCUMENTS

| | | | |
|---|---|---|---|
| 2003/0090914 A1 | 5/2003 | Jansen et al. | |
| 2016/0049867 A1* | 2/2016 | Liu | H02M 7/53873 363/39 |
| 2019/0103806 A1* | 4/2019 | Miyake | H02M 1/08 |
| 2019/0173319 A1* | 6/2019 | Misawa | H02M 7/53871 |
| 2019/0280603 A1* | 9/2019 | Tomita | H02M 3/33573 |

FOREIGN PATENT DOCUMENTS

| | | | |
|---|---|---|---|
| JP | 2006246681 | | 9/2006 |
| JP | 2014168355 | | 9/2014 |
| JP | 2014168355 A | * | 9/2014 |
| WO | WO8704038 | | 7/1987 |

OTHER PUBLICATIONS

Panov, Yuri, Jovanovic, M., "Performance Evaluation Of 79-W Two Stage Adapters For Notebook Computers," APEC '99, Fourteenth Annual Applied Power Electronics Conference and Exposition, New York, NY, IEEE, vol. 2, Mar. 1999, pp. 1059-1065.

* cited by examiner

Fig. 11

CONTROL METHOD AND CONTROL DEVICE OF ISOLATED CONVERTER

CROSS-REFERENCE TO RELATED APPLICATIONS

The present application claims priority to Chinese Patent Application No. 202110047186.6; Filed Jan. 14, 2021, entitled CONTROL METHOD AND CONTROL DEVICE OF ISOLATED CONVERTER that is incorporated herein by reference in its entirety.

TECHNICAL FIELD

The present invention belongs to the field of power electronics, and particularly relates to a control method and control device of an isolated converter.

BACKGROUND ART

High-frequency transformer isolated converters are widely used in the field of power supplies, especially in the voltage boosting link of batteries, and push-pull and full-bridge DC-DC converters are the most typical.

Figure 1:
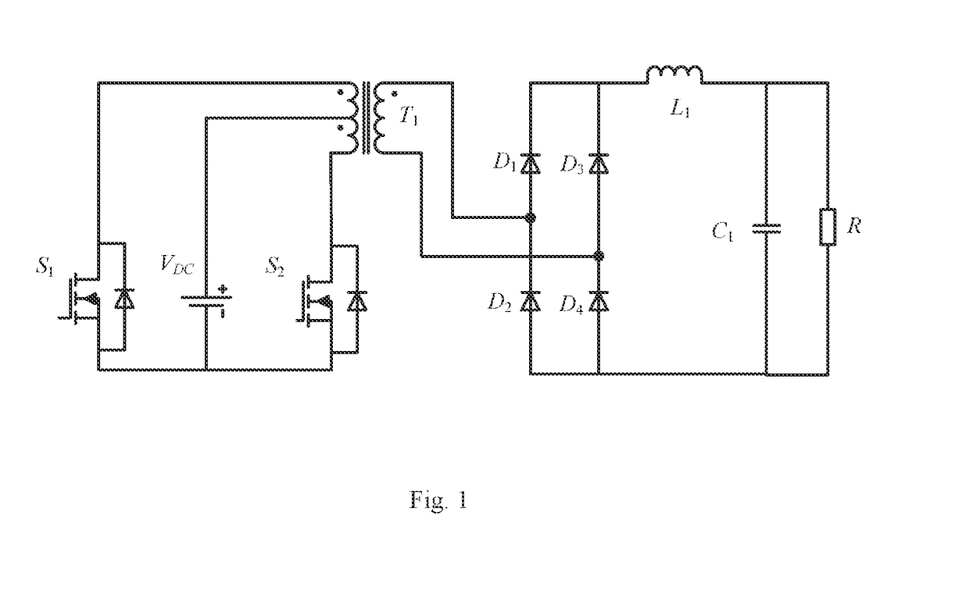
FIG. 1 is a typical topology of a push-pull converter.
Figure 2:
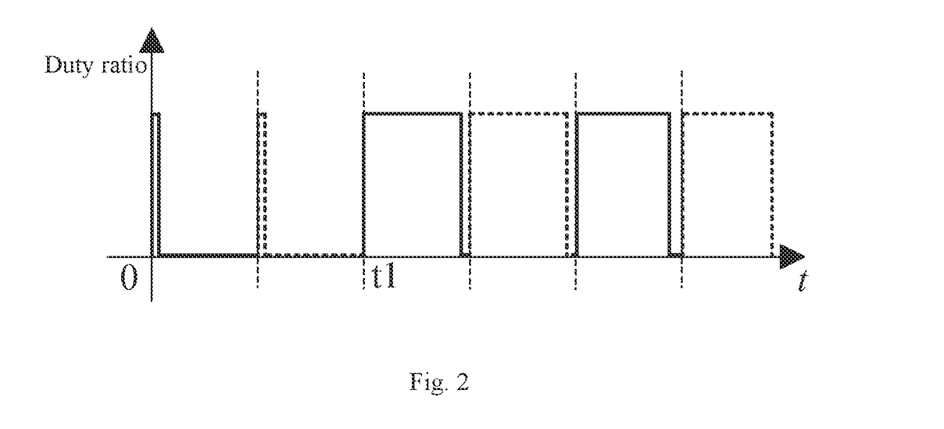
FIG. 2 illustrates driving waveforms of switching transistors S1 and S2 in the converter topology of FIG. 1.
Figure 3:
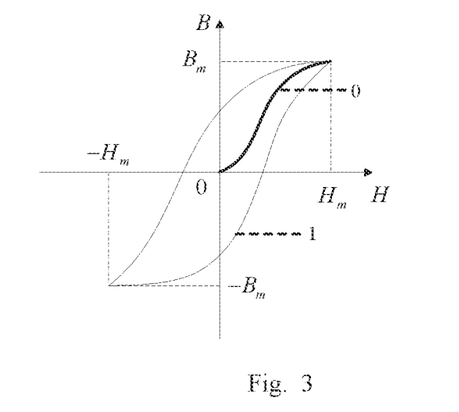
FIG. 3 illustrates an excitation curve of a transformer in the converter topology of FIG. 1 based on the driving waveforms shown in FIG. 2.

FIG. 1 is a typical topology of the push-pull converter. An output voltage of the DC power supply VDC supplies power to a load R through a transformer T1, a rectifier bridge composed of diodes D1-D4 and an inductor L1, a capacitor C1 is connected in parallel to the load R, and two switching transistors S1 and S2 are alternately turned on. When there is no load, a duty ratio of the switching transistors S1 and S2 is very small, and when a heavy load is suddenly applied, the duty ratio of the switching transistors S1 and S2 increases rapidly. Referring to driving waveforms of the switching transistors S1 and S2 shown in FIG. 2, solid lines and dashed lines respectively correspond to the driving waveforms of $S_1$ and $S_2$. At a moment t1, the converter is suddenly applied with heavy load from no load. Because excitation of a transformer T1 is very small before the moment t1, the excitation is neglected to be approximately zero here. After the moment t1, the excessive duty ratio may cause excessive unidirectional excitation change as shown by a curve 0 in FIG. 3, which may easily lead to magnetic saturation of the transformer T1. A curve 1 in FIG. 3 is an excitation curve during normal operation.

Figure 4:
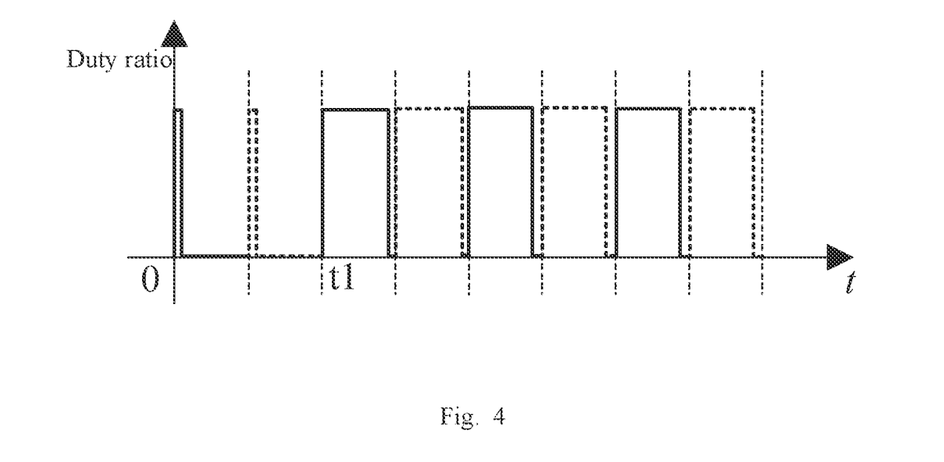
FIG. 4 illustrates another driving waveforms of the switching transistors S1 and S2 in the converter topology of FIG. 1.

In order to solve the above problem, a conventional method is to increase switching frequencies of S1 and S2. The driving waveforms are shown in FIG. 4, and solid lines and dashed lines correspond to the driving waveforms of S1 and S2 respectively. At the moment t1, the converter is suddenly applied with heavy load from no load, and the duty ratio increases rapidly. However, due to the reduction of a switching period, the on time may also be shorter than that of FIG. 2, thereby avoiding the magnetic saturation of the transformer. However, increasing the switching frequency may increase the switching loss significantly, and may further lead to other problems such as temperature rise and the like.

In conclusion, when an output load of the high-frequency transformer isolated converter changes suddenly from no load to full load, a driving pulse width of the switching transistor on a primary side of the transformer may suddenly change from a small duty ratio to a large duty ratio. Because the excitation of the transformer is very small at an initial stage, the excessive unidirectional excitation change may easily cause a magnetic induction intensity of the transformer to be greater than a maximum allowable operation value, and then cause the magnetic saturation of the transformer. In order to prevent the excitation saturation of the transformer, the conventional method is to increase the switching frequency of the switching transistor on the primary side of the transformer, thereby causing significant increase of the switching loss, and increasing the heat dissipation cost of the converter.

SUMMARY OF THE INVENTION

Therefore, the present invention aims at overcoming the defects of the prior art to provide a control device for an isolated converter, which includes:

a comparison module, which receives a load percentage of the isolated converter, compares the load percentage with a first preset threshold and a second preset threshold, and outputs a comparison result; and an adjustment module, which receives the comparison result and adjusts a switching frequency of a switching transistor of the isolated converter based on the comparison result, wherein when the load percentage is not greater than the first preset threshold, the switching frequency is set to a first frequency value to prevent the magnetic saturation of the transformer of the isolated converter; when the load percentage is greater than the second preset threshold and in a stable state, the switching frequency is set to a second frequency value to make the temperature of the isolated converter not greater than the maximum allowable temperature; and the first preset threshold is less than or equal to the second preset threshold, and the first frequency value is greater than the second frequency value.

Preferably, the control device for the isolated converter of the present invention further includes a detection module which is used to detect and output the load percentage of the isolated converter.

According to the control device for the isolated converter of the present invention, preferably, when the load percentage is not greater than the first preset threshold, if the switching frequency is less than the first frequency value, the switching frequency increases directly to the first frequency value; and when the load percentage is greater than the second preset threshold and in the stable state, if the switching frequency is greater than the second frequency value, the switching frequency decreases gradually to the second frequency value, and preferably, the switching frequency decreases to the second frequency value gradually at a specific interval or decreases gradually to the second frequency value at a charging/discharging curve of an RC circuit.

The control device for the isolated converter of the present invention preferably includes a micro-controller, a time delay circuit, a triode, a first resistor, a second resistor, a first capacitor and a pulse width modulation chip.

The micro-controller changes an output voltage according to the comparison result between the load percentage of the isolated converter and the preset threshold.

An output end of the micro-controller is connected to a base electrode of the triode via the time delay circuit; an emitting electrode of the triode is grounded; a collecting electrode is connected to a first pin of the pulse width modulation chip through the first resistor; a node between the first pin and the first resistor is grounded through the second resistor; and a second pin of the pulse width modulation chip is grounded through the first capacitor.

An output end of the pulse width modulation chip is connected to the switching transistor of the isolated converter to adjust the switching frequency of the switching transistor.

The time delay circuit is used to realize the direct increase and gradual decrease of the output frequency of the pulse width modulation chip.

According to the control device for the isolated converter of the present invention, preferably, the time delay circuit includes a third resistor, a fourth resistor, a fifth resistor, a diode and a second capacitor; a series branch formed by the third resistor and the fourth resistor is connected in parallel with a series branch formed by the diode and the fifth resistor; a node between the third resistor and the diode is connected to an output end of a digital signal module of the micro-controller; a node between the fourth resistor and the fifth resistor is connected to the base electrode of the triode; and a node between the third resistor and the fourth resistor is grounded through the second capacitor.

According to the control device for the isolated converter of the present invention, preferably, the time delay circuit includes an analog signal module, a software control unit and a third resistor; the analog signal module is connected to the output end of the micro-controller; the software control unit is used to control an output analog signal of the analog signal module; and the analog signal end is connected to one end of the third resistor, and the other end of the third resistor is connected to the base electrode of the triode.

According to the control device for the isolated converter of the present invention, preferably, the output end of the pulse width modulation chip is connected to the switching transistor of the isolated converter through a driving amplification circuit.

According to the control device for the isolated converter of the present invention, preferably, the comparison module is contained in the micro-controller.

The control device for the isolated converter of the present invention preferably includes an MCU connected to the switching transistor of the isolated converter, which changes a periodic register value of a PWM generation module according to the comparison result between the load percentage of the isolated converter and the preset threshold, thereby changing the switching frequency of the switching transistor.

The present invention also provides a control method for an isolated converter, which includes the following steps:
a comparison step: comparing a load percentage of the isolated converter with a first preset threshold and a second preset threshold; and
an adjustment step: adjusting a switching frequency of a switching transistor of the isolated converter based on a comparison result of the comparison step, wherein when the load percentage is not greater than the first preset threshold, the switching frequency is set to a first frequency value to prevent the magnetic saturation of a transformer of the isolated converter; when the load percentage is greater than the second preset threshold and in a stable state, the switching frequency is set to a second frequency value to make the temperature of the isolated converter not greater than the maximum allowable temperature; and the first preset threshold is less than or equal to the second preset threshold, and the first frequency value is greater than the second frequency value.

Compared with the prior art, the present invention adjusts the switching frequency by detecting the load percentage, so that not only can the temperature rise problem of the converter when the converter operates stably under full load be solved, but also the magnetic saturation problem of the transformer when the converter is applied with heavy load suddenly from no load can be avoided effectively.

BRIEF DESCRIPTION OF THE DRAWINGS

The embodiments of the present invention are further described with reference to the drawings below, wherein.

DETAILED DESCRIPTION OF THE INVENTION

To make the purpose, technical solutions and advantages of the present invention more clear and understandable, the present invention is described in detail below through embodiments in combination with accompanying drawings. It shall be understood that the specific embodiments described herein are merely used to interpret the present invention rather than limiting the present invention.

First Embodiment

Figure 5:
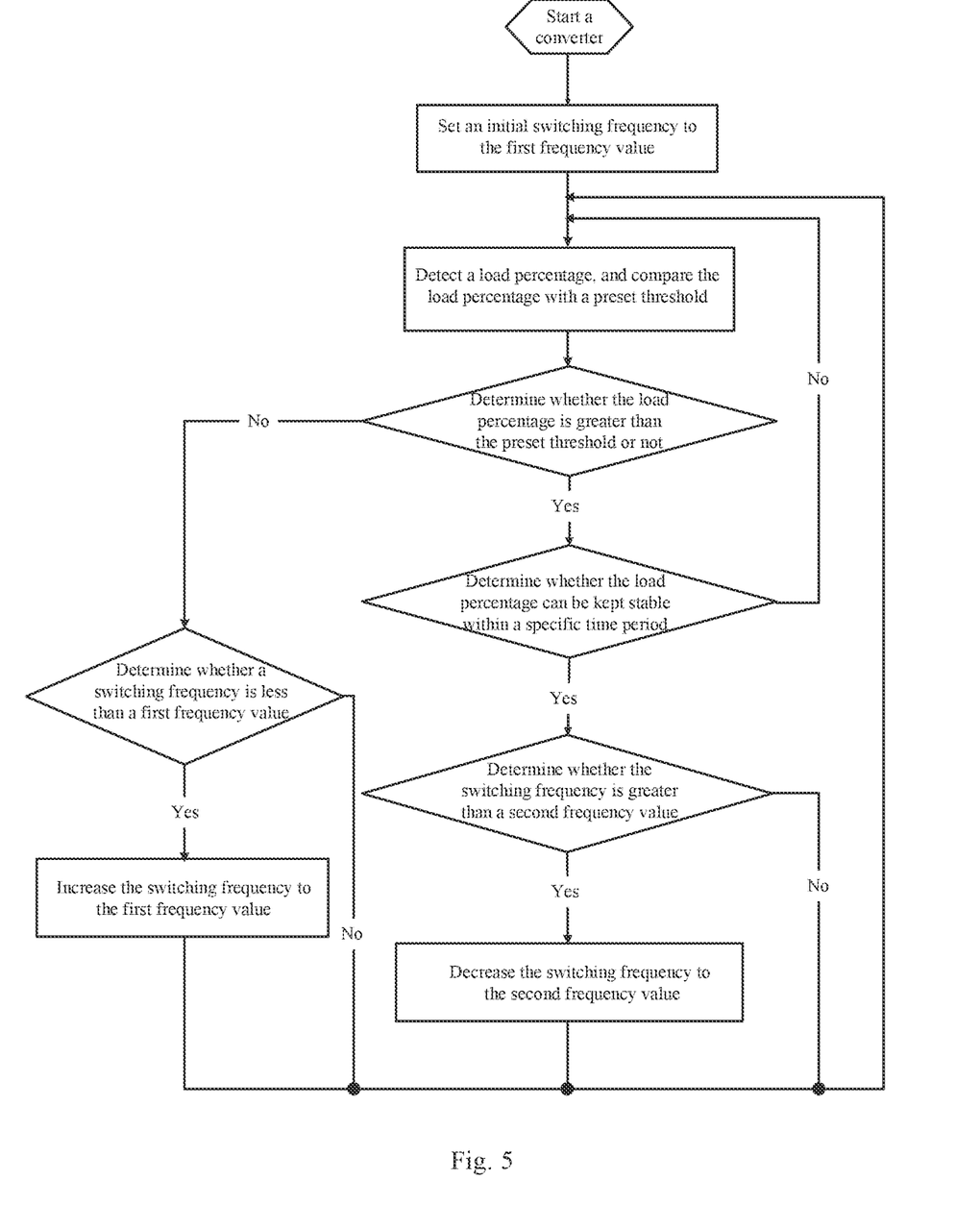
FIG. 5 illustrates a flow chart of a switching frequency adjustment method of an isolated converter according to a first embodiment of the present invention.

An embodiment of the present invention provides a switching frequency adjustment method for an isolated converter, which adjusts a switching frequency according to a load so as to reduce the switching loss. A specific adjustment method is shown in a flow chart of FIG. 5, which includes the following steps:

Step 1: the isolated converter is started, and an initial switching frequency is set to a first frequency value (such as 55 kHz);

Step 2: a load percentage is detected, the load percentage is compared with a preset threshold (such as 50% of rated power), and in the present invention, the load percentage is preferably load power; and Step 3: the switching frequency of the isolated converter is adjusted based on a comparison result between the load percentage and the preset threshold, wherein when the load percentage is not greater than the preset threshold, the switching frequency increases to a first frequency value, and when the load percentage is greater than the preset threshold and in a stable state, the switching frequency decreases to a second frequency value. In the present invention, the stable state refers to that the load percentage is kept at a constant value or basically kept at the constant value (for example, floating between 90% and 110% of the constant value) within a specific period of time (such as 2 s). However, the limitation to the stable state is only exemplary and not restrictive.

Specifically, whether the load percentage is greater than the preset threshold or not is determined.

If no, whether the current switching frequency is less than the first frequency value or not is further determined; if the switching frequency is less than the first frequency value, the switching frequency increases to the first frequency value; if the switching frequency is not less than the first frequency value (generally equal to the first frequency value), the switching frequency is not adjusted, and the load percentage is detected continuously; and that is, if the load percentage is not greater than the preset threshold, a higher switching frequency (the first frequency value) is kept so as to prevent the magnetic saturation of the transformer of the isolated converter, that is, kept within a maximum allowable magnetic induction intensity of the transformer.

If yes, whether the load percentage is in the stable state is further determined; if the load percentage is unstable, the load percentage is detected continuously; if the load percentage is in the stable state, whether the current switching frequency is greater than the second frequency value (such as 40 kHz) is further determined; if the switching frequency is greater than the second frequency value, the switching frequency decreases to the second frequency value; if the switching frequency is not greater than the second frequency value (generally equal to the second frequency value), the switching frequency is not adjusted, and the load percentage is detected continuously; that is, if the load percentage is greater than the preset threshold and in the stable state, a lower switching frequency (the second frequency value) is kept, so that the temperature of the isolated converter is not greater than the maximum allowable temperature; and the maximum temperature is the maximum temperature that elements of the isolated converter can bear.

In the present invention, the higher first frequency value and the lower second frequency value are selected according to specific product models and application scenarios, preferably in a range of 1-500 kHz.

In the present embodiment, in order to avoid the problem that an output load just falls on a load switching point (for example, 50% of the rated load), which causes the system to repeatedly adjust the switching frequency, a hysteresis loop of load switching can be added to solve the problem. For example, a hysteresis loop of 10% of the rated load is set:

When the load percentage is less than 45%, a higher switching frequency is adopted.

When the load percentage is 45%-55%, the current switching frequency is kept unchanged.

When the load percentage is greater than 55%, the switching frequency decreases gradually to the lower switching frequency.

That is, the aforementioned preset threshold is set to a preset threshold range; when the load percentage is less than a minimum value of the preset threshold range, the higher switching frequency is adopted; when the load percentage is greater than a maximum value of the preset threshold range, the lower switching frequency is adopted; and when the load percentage is just within the preset threshold range, the original switching frequency is kept unchanged, and the switching frequency is not adjusted.

Figure 6:
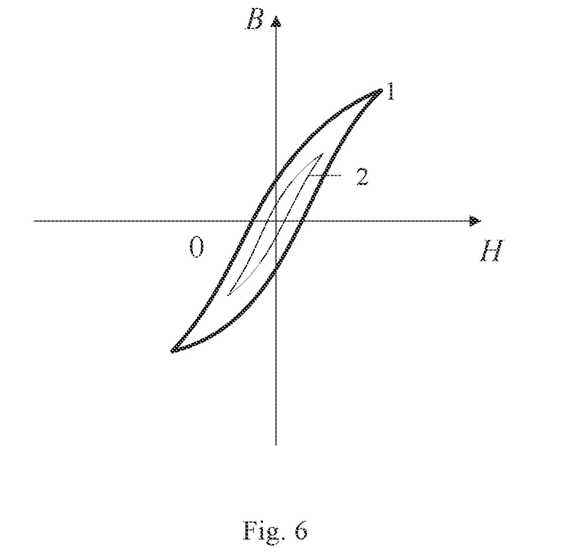
FIG. 6 and FIG. 7 illustrate changes of excitation curves of the transformer respectively when the switching frequency increases and decreases.
Figure 7:
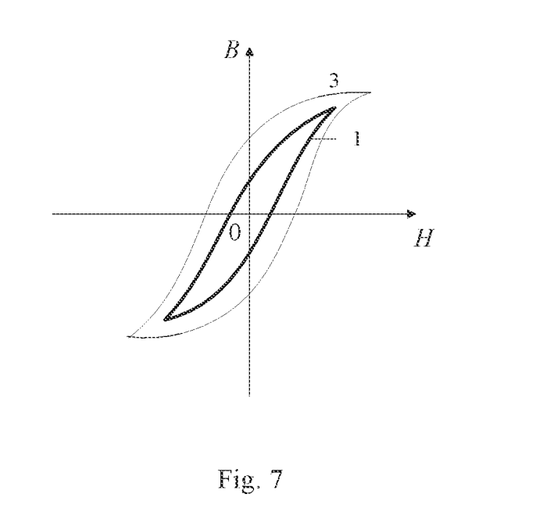

Furthermore, see the change of a transformer excitation curve when the switching frequency increases as shown in FIG. 6 and the change of a transformer excitation curve when the switching frequency decreases as shown in FIG. 7. When the switching frequency increases, the transformer excitation curve is changed from a curve 1 to a curve 2 in FIG. 6; the excitation curve shrinks, which may not cause the transformer saturation, so that the switching frequency may increase rapidly, for example, the current frequency hops to the first frequency value (that is, the switching frequency changes directly from the current frequency to the first frequency value). When the switching frequency decreases, the transformer excitation curve is changed from the curve 1 to a curve 3 in FIG. 7; due to the expansion of the excitation curve, if the sudden change of the frequency may cause the saturation of the transformer, preferably, the switching frequency decreases gradually; and for example, the switching frequency decreases gradually at a specific interval, so that the excitation curve changes smoothly, and the saturation of the transformer is avoided. The specific interval may be a fixed value, for example, the switching frequency may decrease gradually to the second frequency value at an interval of 1 kHz; and the specific interval may also be a variable value, for example, the switching frequency may decrease gradually to the second frequency value randomly at 1 kHz, 2 kHz and 3 kHz.

Second Embodiment

Figure 8:
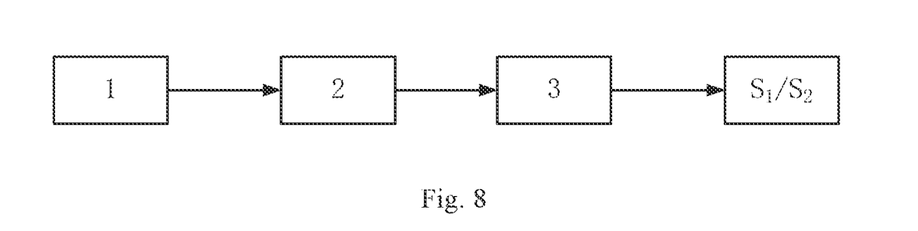
FIG. 8 illustrates a switching frequency adjustment device of the isolated converter according to a second embodiment of the present invention.

The second embodiment provides a switching frequency adjustment device for an isolated converter. Referring to FIG. 8, the switching frequency adjustment device includes a detection module 1, a comparison module 2 and an adjustment module 3; the detection module 1 is used to detect a load percentage and transmit a detection result to the comparison module 2; the detection module 1 may be a detection module arranged in the isolated converter, and may also be a detection module arranged outside the isolated converter; a preset threshold is pre-stored in the comparison module 2, and the comparison module compares the received load percentage with the preset threshold and transmits a comparison result to the adjustment module 3; the adjustment module 3 adjusts a switching frequency of a switching transistor S1 or S2 based on the received comparison result, and the switching frequency of the switching transistor S1 or S2 may be fed back to the adjustment module 3; when the load percentage is not greater than the preset threshold, the switching frequency increases to a first frequency value; and when the load percentage is greater than the preset threshold and in the stable state, the switching frequency decreases to a second frequency value. Specifically, the adjustment module determines whether the load percentage is greater than the preset threshold or not.

If no, whether the current switching frequency is less than the first frequency value or not is further determined; if the switching frequency is less than the first frequency value, the switching frequency increases to the first frequency value; if the switching frequency is not less than the first frequency value (generally equal to the first frequency value), the switching frequency is not adjusted, and the load percentage is detected continuously; and that is, if the load percentage is not greater than the preset threshold, a higher switching frequency (the first frequency value) is kept.

If yes, whether the load percentage is in the stable state is further determined; if the load percentage is unstable, the load percentage is detected continuously; if the load percentage is in the stable state, whether the current switching frequency is greater than the second frequency value (such as 40 kHz) is further determined; if yes, the switching frequency decreases to the second frequency value; if the switching frequency is not greater than the second frequency value (generally equal to the second frequency value), the switching frequency is not adjusted, and the load percentage is detected continuously; and that is, if the load percentage is greater than the preset threshold and in the stable state, a lower switching frequency (the second frequency value) is kept.

Preferably, a preset threshold range is pre-stored in the comparison module 2; when the load percentage is less than a minimum value of the preset threshold range, the higher switching frequency is adopted; when the load percentage is greater than a maximum value of the preset threshold range, the lower switching frequency is adopted; and when the load percentage is just within the preset threshold range, the original switching frequency is kept unchanged, and the switching frequency is not adjusted.

Preferably, the adjustment module 3 reduces the switching frequency of the switching transistor S1 or S2 gradually at a specific interval.

A specific example of the switching frequency adjustment device for the isolated converter is given below.

First Example

Figure 9:
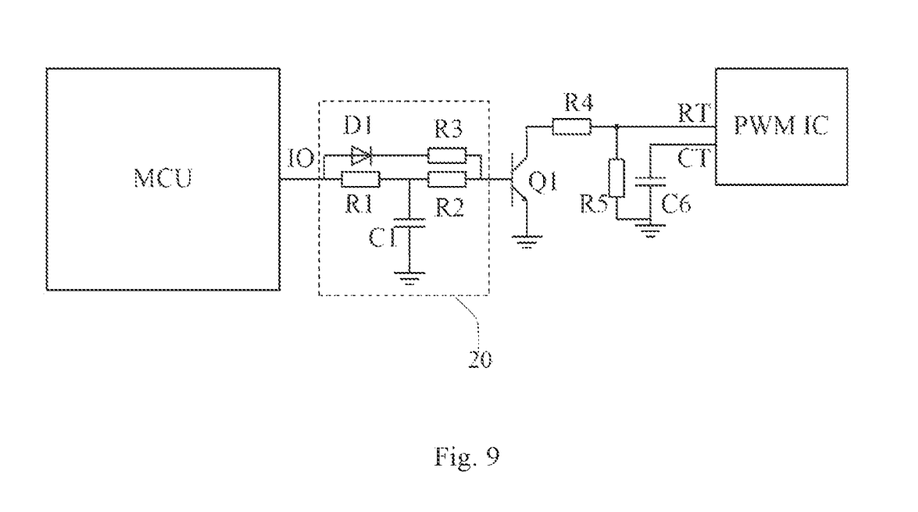
FIG. 9 is a structural schematic diagram of a circuit of a first example of the switching frequency adjustment device of the present invention.

See a structural schematic diagram of a circuit of the first example of the switching frequency adjustment device of the present invention shown in FIG. 9. A micro-controller MCU receives a comparison result between a load percentage and a preset threshold and outputs a digital voltage signal through a digital interface IO based on the comparison result; the digital voltage signal controls an on-off state (including an on state, an amplification state and an off state) of a triode Q1 through a time delay circuit 20 and then adjusts an external resistor R4 and an external resistor R5 arranged outside an oscillator of a pulse width modulation chip (PWM IC) and further adjusts an oscillation frequency of the PWM IC; the oscillation frequency corresponds to an output frequency of the PWM IC; the PWM IC is preferably connected to the switching transistors $S_1$ and $S_2$ through a driving circuit so as to adjust the switching frequency thereof; and the switching frequency is consistent with the output frequency of the PWM IC. Specifically, the time delay circuit 20 includes resistors R1 and R2 connected in series, a diode D1 and a resistor R3 connected in series, and a capacitor C1; a branch formed by the resistors R1 and R2 is connected in parallel with a branch formed by the diode D1 and the resistor R3; a node between the resistor R1 and the diode D1 is connected to an IO interface of the MCU; a node between the resistors R1 and R2 is grounded through the capacitor C1; a node between the resistors R2 and R3 is connected to a base electrode of the triode Q1; an emitting electrode of the triode Q1 is grounded, and a collecting electrode is connected to an RT pin of the PWM IC through a resistor R4; and a CT pin of the PWM IC is grounded through a capacitor C6; and a node between the resistor R4 and the RT pin is grounded through a resistor R5.

A specific control process of the switching frequency adjustment device of the example is as follows:

(1) When an JO output signal of the MCU changes from low level to high level, the D1 is turned on, the high-level voltage is provided to the base electrode of the Q1 through the D1, the Q1 is saturated and turned on, and the R4 and the R5 are equivalent to parallel connection. At the time, because the RT pin of the PWM IC has a small resistance value, the output frequency of the PWM IC is relatively high.

At the same time, the high level outputted by the MCU charges the C1 through the R1, and the voltage of the C1 increases gradually from low level to high level so as to prepare for the output of the MCT changing from high level to low level.

(2) When the IO output signal of the MCU changes from high level to low level, the high level of the C1 is discharged through the R1, the C1 changes gradually from high level to low level, and the Q1 passes through an amplification region from saturation turn-on and changes gradually to an off region. At the time, because the RT pin of the PWM IC has a large resistance value that is R5, the output frequency of the PWM IC is relatively low.

Figure 10:
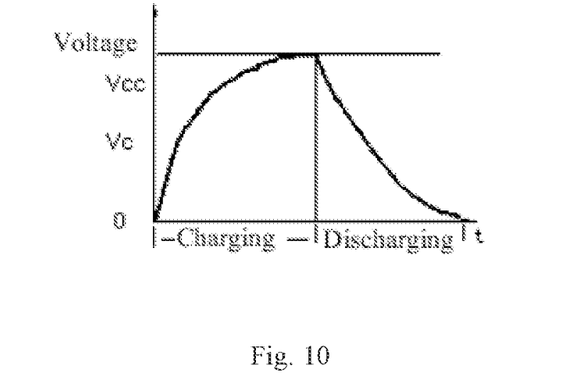
FIG. 10 illustrates an example of a charging/discharging curve of an RC circuit.

In this process, the time when the output frequency of the PWM IC changes gradually from high level to low level is decided by the discharging time of the C1 through the R1, that is, the switching frequency decreases gradually by a charging/discharging curve of an RC circuit, such as the charging/discharging curve of the RC circuit shown in FIG. 10.

It may be seen from the example that:

(1) When the level of the digital voltage signal of the MCU changes, the output frequency of the PWM IC changes synchronously.

(2) By adjusting parameters of the time delay circuit, especially the R1 and the C1, the changing speed of the voltage of the C1 may be changed, thereby changing the working state of the triode Q1. If the collecting electrode (C electrode) and emitting electrode (E electrode) of the triode are equivalent to a resistor, the resistance value of the equivalent resistor changes with the voltage of the C1. From the perspective of the PWM IC, the resistance value of a parallel resistor of an oscillation resistor connected with the PWM IC changes with the voltage of the C1, and finally, the output frequency of the PWM IC changes with the voltage of the C1. By adjusting the parameters of the R1 and C1, the changing speed of the voltage of the C1 may be changed, so that the changing speed of the output frequency of the PWM IC may be changed, thereby realizing the rapid increase and gradual decrease of the output frequency of the PWM IC.

3) By adjusting the resistance value of the R4, the resistance value of the RT pin connected with the PWM IC may be changed, so that the changing range of the output frequency of the PWM IC may be adjusted.

Those skilled in the art can understand that in the example, the comparison module may be contained in the micro-controller MCU, which receives the load percentage information and compares the load percentage with the preset threshold.

Second Example

Figure 11:
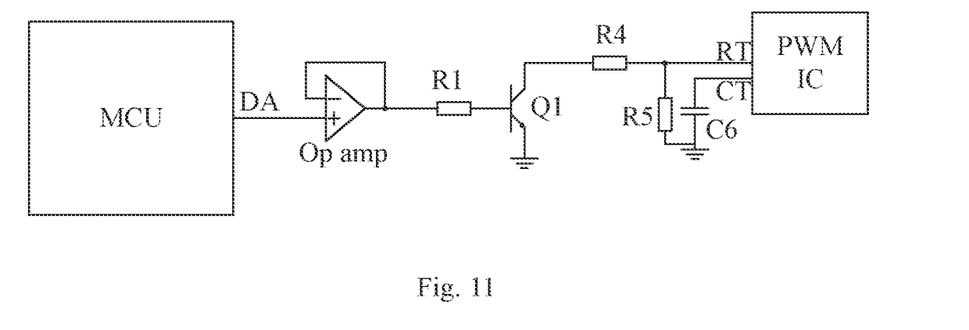
FIG. 11 is a structural schematic diagram of the circuit of a second example of the switching frequency adjustment device of the present invention.

See a structural schematic diagram of a circuit of the second example of the switching frequency adjustment device of the present invention shown in FIG. 11. Based on a comparison result between a load percentage and a preset threshold, an output of the MCU outputs a variable analog voltage signal (a DA output) through an analog signal module (a DA module); preferably, the driving capacity is enhanced by the buffering of a follower Op amp, and then an on-off state (including an on state, an amplification state and an off state) of a triode Q1 is controlled by a resistor R1, then external resistors R4 and R5 outside an oscillator of a pulse width modulation chip PWM IC are adjusted, and then an oscillation frequency of the PWM IC is adjusted; the oscillation frequency corresponds to an output frequency of the PWM IC; the PWM IC is preferably connected to switching transistors S1 and S2 through a driving circuit so as to adjust the switching frequency thereof; and the switching frequency is consistent with the output frequency of the PWM IC. The analog signal module may be contained in the MCU, and may also be arranged outside the MCU. Specifically, in the example, the analog signal module (the DA module), a software control unit for controlling an analog signal, a preferred follower and the resistor R1 form a time delay circuit; and the changing speed of an output signal of the DA module is controlled by the software control unit, thereby realizing the rapid increase and gradual decrease of the output frequency of the PWM IC. Furthermore, in the example, the following circuit of the resistor R1 is consistent with that of the first example, that is, an emitting electrode of the triode Q1 is grounded, a collecting electrode is connected to an RT pin of the PWM IC through the resistor R4, a CT pin of the PWM IC is grounded through a capacitor C6, and a node between the resistor R4 and the RT pin is grounded through the resistor R5.

A specific control process of the switching frequency adjustment device of the example is as follows:

(1) When a DA output signal of the MCU changes from low level to high level rapidly, the Q1 is saturated and turned on, and the R4 and the R5 are equivalent to parallel connection. At the time, because the RT pin of the PWM IC has a small resistance value, the output frequency of the PWM IC is relatively high.

(2) When the DA output signal of the MCU changes gradually from high level to low level, the Q1 passes through an amplification region from saturation turn-on and gradually changes to an off region. At the time, because the RT pin of the PWM IC has a large resistance value that is R5, the output frequency of the PWM IC is relatively low.

In this process, the changing speed of the output frequency of the PWM IC gradually from high level to low level depends on the changing speed of the DA signal controlled by the software unit.

It may be seen from the example that:

(1) When the level of the DA output of the MCU changes, the output frequency of the PWM IC changes synchronously.

(2) By adjusting the time delay circuit, the rapid increase and gradual decrease of the output frequency of the PWM IC can be realized.

3) By adjusting the resistance value of the R4, the resistance value of the RT pin connected with the PWM IC may be changed, so that the changing range of the output frequency of the PWM IC may be adjusted.

The time delay circuit of the present invention is not limited to the circuit structure in the example and may have other variations, as long as the rapid increase and gradual decrease of the oscillation frequency of the PWM IC can be realized.

Besides the above two examples in which the switching frequency is adjusted by hardware circuits, a digital control chip may also be adopted to realize the adjustment of the switching frequency of the S1 and S2, for example, the switching frequency may be adjusted by changing a periodic register value of a PWM generation module in the MCU.

1) When the switching frequency needs to increase rapidly, the periodic register value of the PWM generation module is directly changed to a target value.

2) When the switching frequency needs to decrease gradually, the periodic register value of the PWM generation module can be changed gradually to the target value by a loop instruction. The changing range of the switching frequency may be changed by changing the target value of the periodic register. The changing speed of the switching frequency may be changed by changing the circulation times and the changing percentage of the periodic register value.

To reflect the effect of the present invention, a product Callisto HV RT 3 kVA of EATON Company was tested by the inventor. By adopting the method of the prior art, in order to prevent the saturation of the transformer, the switching frequency was set to 55 kHz, a full-load battery was discharged to cause temperature rise, and the temperature of MOSFET rose to be greater than 140° C. and was still unstable, so the test can only be stopped by shutting down, and the predicted maximum temperature may reach 155° C. By adopting the solution of the present invention for test again, the maximum temperature of the MOSFET was less than 110° C., so that the temperature rise problem of the transformer can be solved effectively.

Although the present invention is already described by preferred embodiments, the present invention is not limited to the embodiments described herein, but also includes various changes and variations made without departing from the scope of the present invention.

The invention claimed is:

1. A control device for an isolated converter comprising a switching transistor that selectively applies a voltage to a transformer, the control device comprising:
   a comparison module that receives a load percentage of the isolated converter, compares the load percentage with a first preset threshold and a second preset threshold, and outputs a comparison result; and
   an adjustment module that receives the comparison result and adjusts a switching frequency of the switching transistor based on the comparison result, wherein when the load percentage is not greater than the first preset threshold, the switching frequency is set to a first frequency to prevent magnetic saturation of the transformer, wherein when the load percentage is greater than the second preset threshold and in a stable state, the switching frequency is set to a second frequency to make a temperature of the isolated converter not greater than a maximum allowable temperature, wherein the first preset threshold is less than or equal to the second preset threshold, and wherein the first frequency is greater than the second frequency.

2. The control device according to claim 1, further comprising a detection module which detects and outputs the load percentage of the isolated converter.

3. The control device according to claim 1, wherein when the load percentage is not greater than the first preset threshold, if the switching frequency is less than the first frequency, the switching frequency increases directly to the first frequency; and when the load percentage is greater than the second preset threshold and is in the stable state, if the switching frequency is greater than the second frequency, the switching frequency decreases gradually to the second frequency.

4. The control device according to claim 3, comprising a micro-controller, a time delay circuit, a triode, a first resistor, a second resistor, a first capacitor and a pulse width modulation chip, wherein:

the micro-controller changes an output voltage at an output thereof according to the comparison result between the load percentage of the isolated converter and the preset threshold;
the output of the micro-controller is connected to a base electrode of the triode via the time delay circuit;
an emitting electrode of the triode is grounded;
a collecting electrode of the triode is connected to a first pin of the pulse width modulation chip through the first resistor;
a node between the first pin and the first resistor is grounded through the second resistor;
a second pin of the pulse width modulation chip is grounded through the first capacitor;
an output of the pulse width modulation chip is connected to the switching transistor of the isolated converter to adjust the switching frequency of the switching transistor; and
the time delay circuit is used to realize the direct increase and gradual decrease of an output frequency of the pulse width modulation chip.

5. The control device according to claim 4, wherein the time delay circuit comprises a third resistor, a fourth resistor, a fifth resistor, a diode and a second capacitor wherein a series branch formed by the third resistor and the fourth resistor is connected in parallel with a series branch formed by the diode and the fifth resistor, wherein a node between the third resistor and the diode is connected to an output of a digital signal module of the micro-controller, wherein a node between the fourth resistor and the fifth resistor is connected to the base electrode of the triode, and wherein a node between the third resistor and the fourth resistor is grounded through the second capacitor.

6. The control device according to claim 4, wherein the time delay circuit comprises an analog signal module, a software control unit and a third resistor wherein the analog signal module is connected to the output of the micro-controller wherein the software control unit is used to control an output analog signal at an output of the analog signal module, wherein the analog signal of the analog signal module is connected to a first terminal of the third resistor, and wherein a second terminal of the third resistor is connected to the base electrode of the triode.

7. The control device for the isolated converter according to claim 4, wherein the output of the pulse width modulation chip is connected to the switching transistor of the isolated converter through a driving amplification circuit.

8. The control device for the isolated converter according to claim 4, wherein the comparison module is contained in the micro-controller.

9. The control device according to claim 3, comprising a pulse width modulation chip connected to the switching transistor of the isolated converter, which changes a periodic register value of a generation module according to the comparison result between the load percentage of the isolated converter and the preset threshold, thereby changing the switching frequency of the switching transistor.

10. A control method for an isolated converter comprising a switching transistor that selectively applies a voltage to a transformer, the method comprising:
comparing a load percentage of the isolated converter with a first preset threshold and a second preset threshold; and
adjusting a switching frequency of a switching transistor of the isolated converter based on the comparison, wherein when the load percentage is not greater than the first preset threshold, the switching frequency is set to a first frequency value to prevent magnetic saturation of a transformer of the isolated converter, wherein when the load percentage is greater than the second preset threshold and in a stable state, the switching frequency is set to a second frequency value to make the temperature of the isolated converter not greater than the maximum allowable temperature, wherein the first preset threshold is less than or equal to the second preset threshold, and wherein the first frequency value is greater than the second frequency value.

11. An apparatus comprising:
a DC-DC converter circuit comprising a transformer, at least one switching transistor configured to selectively couple a DC source to a primary winding of the transformer, and a rectifier coupled to a secondary winding of the transformer; and
a control circuit configured to generate a measure of loading of the DC-DC converter circuit and to adjust a switching frequency of the at least one switching transistor responsive to the detected measure of loading, wherein the control circuit is configured to set the switching frequency to a first frequency if the measure of loading is less than a first threshold to prevent magnetic saturation of the transformer and to set the switching frequency to a second frequency if the measure of loading is greater than a second threshold to maintain a temperature of the converter circuit below a maximum temperature.

12. The apparatus of claim 11, wherein the second frequency is less than the first frequency.

13. The apparatus of claim 12, wherein the first threshold corresponds to first amount of loading and wherein the second threshold corresponds to a second amount of loading greater than or equal to the first amount of loading.

14. The apparatus of claim 13:
wherein, when the measure of loading is less than the first threshold and the switching frequency is less than the first frequency, the control circuit stepwise increases the switching frequency to the first frequency; and
wherein, when the measure of loading is greater than the second threshold and the switching frequency is greater than the second frequency, the control circuit gradually decreases the switching frequency to the second frequency.

* * * * *